United States Patent [19]

Drath

[11] 4,437,690
[45] Mar. 20, 1984

[54] HIGH PRESSURE HOSE SWIVEL CONNECTOR

[76] Inventor: Edwin H. Drath, 1218 S. Patton, Arlington Heights, Ill. 60005

[21] Appl. No.: 304,802

[22] Filed: Sep. 23, 1981

[51] Int. Cl.³ .............................................. F16L 27/00
[52] U.S. Cl. ................................... 285/272; 285/185; 285/280
[58] Field of Search ............... 285/185, 190, 163, 191, 285/272, 168, 123, 280

[56] References Cited

U.S. PATENT DOCUMENTS

| | | | |
|---|---|---|---|
| 628,692 | 7/1899 | Campbell | 285/185 X |
| 1,685,351 | 9/1928 | Davis | 285/280 X |
| 2,472,030 | 5/1949 | Thulin | 285/185 X |
| 3,166,252 | 1/1965 | O'Brien et al. | 285/168 X |
| 3,736,986 | 6/1973 | Magdars | 285/185 X |
| 4,045,059 | 8/1977 | Smith | 285/185 X |

Primary Examiner—Richard J. Scanlan, Jr.
Attorney, Agent, or Firm—Hill, Van Santen, Steadman & Simpson

[57] ABSTRACT

A high pressure hose swivel connector comprises a pair of body members which are swively connected together in pressure-tight swivel relation by means such as a bolt and the three joints involving the swivel surfaces and the joints between the bolt and the body members of the connector are thoroughly leak proof by means of O-ring seals.

3 Claims, 4 Drawing Figures

HIGH PRESSURE HOSE SWIVEL CONNECTOR

This invention relates to a new and improved high pressure hose swivel connector, and is more particularly concerned with such a connector especially useful for connecting high pressure paint hose to a pump or filter.

Much modern day painting is effected by means of spray guns operating at high pressures such as 2000 p.s.i. or greater. Paint under pressure is delivered to the spray gun in each instance through a high pressure hose connected to a high pressure paint source such as a pump or a filter which may intervene between the pump and the hose.

Conventional couplings provide a fixed orientation of the end of the hose attached to the high pressure source device. Oftentimes although there is a substantial length of hose provided, careless pulling on the hose by the spray gun operator places shearing strains on the hose where it is attached to the high pressure paint source device. It is to the alleviation of this problem that the present invention is largely directed.

An important object of the invention is to provide a new and improved high pressure hose swivel connector which will substantially avoid shear stresses on the hose at its connection with a high pressure source.

Another object of the invention is to provide a new and improved high pressure hose swivel connector which will permit the coupling by which the hose is attached to a high pressure source to automatically orient toward the direction in which a pull is exerted on the hose so that pull stresses will be in substantially a tension mode instead of a shear mode.

In accordance with the invention, there is provided a high pressure hose swivel connector, comprising a pair of body members, each of which has a first and second end; each of said members having a respective blind end passage bore opening through its first end; one of said members having means at its first end for connecting its bore with a high pressure source; the other of said members having means at its first end for connecting its bore with a high pressure hose; each of said members having adjacent to its second end a blind end cross port communicating with the inner end of the passage bore of the member and opening from a side face of the member; and means connecting said side faces of the members in pressure-tight swivel relation and with said ports aligned, so that a continuous high pressure passageway is provided by way of said bores and ports.

Other objects, features and advantages of the invention will be readily apparent from the following description of a certain embodiment thereof, taken in conjunction with the accompanying drawing, although variations and modifications may be effected without departing from the spirit and scope of the novel concepts embodied in the disclosure and in which.

Figure 1:
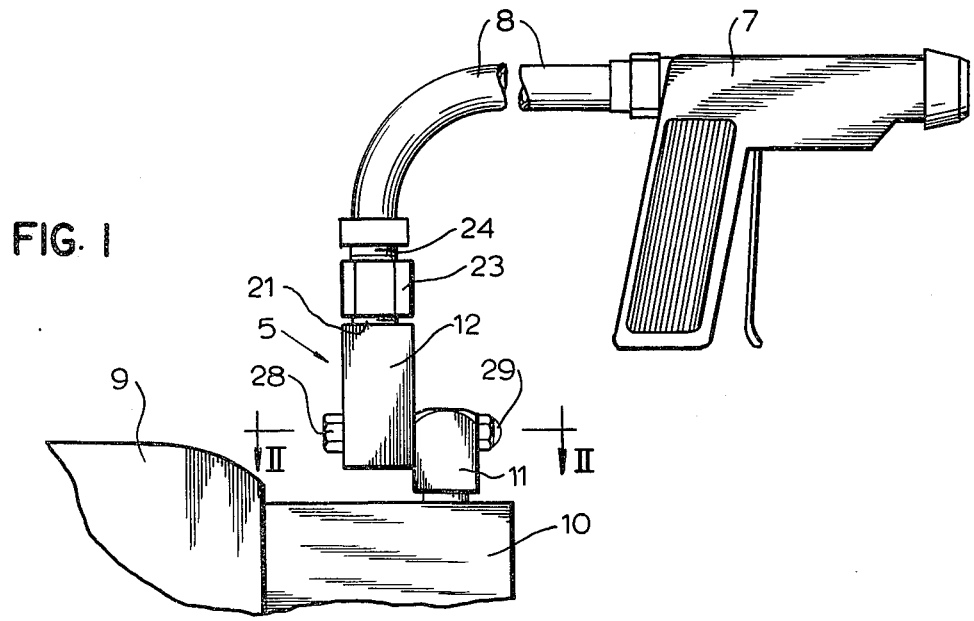
FIG. 1 is a fragmentary side elevational view of an assembly utilizing a connector embodying the invention.
Figure 2:
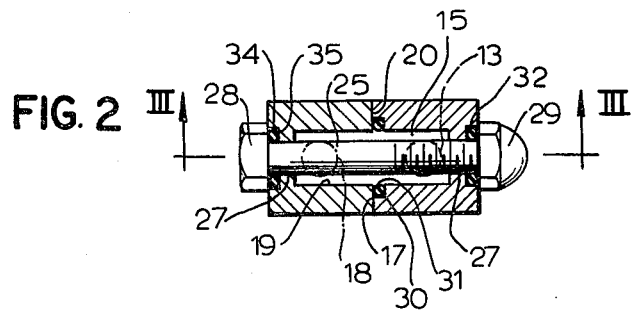
FIG. 2 is an enlarged sectional detail view taken substantially along the line II—II of FIG. 1.
Figure 3:
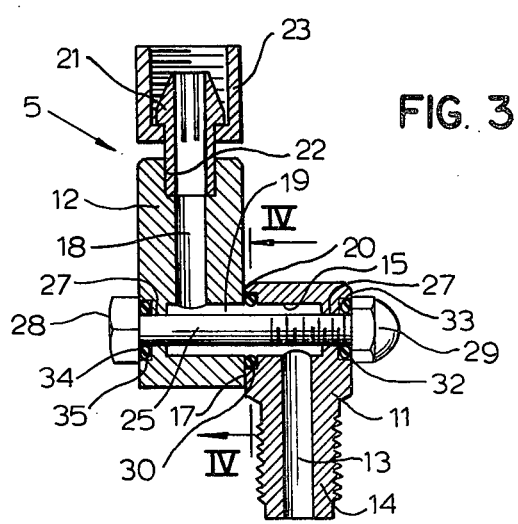
FIG. 3 is a sectional detail view taken substantially along the line III—III in FIG. 2.
Figure 4:
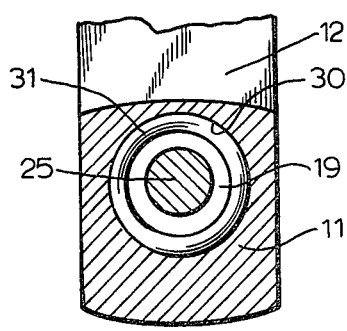
FIG. 4 is an enlarged fragmentary sectional elevational view taken substantially at the plane of line IV—IV in FIG. 3.

In FIG. 1, a connector 5 embodying the invention is illustrated as incorporated in a high pressure paint spraying apparatus system including a high pressure paint delivery gun 7 connected by means of a high pressure hose 8 to a high pressure paint source, such as a pump 9, which functions to drive the paint under high pressure such as 2000 p.s.i. or greater through a filter 10. In this instance, the connector 5 is attached to the filter 10. It will be understood that although the invention is especially well adapted for connecting high pressure paint hose to a high pressure paint source, there may be other high pressure hose connections in which the new and improved connector of the present invention may be useful.

According to the invention, the connector 5 comprises an assembly having a body member 11 and a cooperating body member 12, and each of the body members has a first end and a second end. The body member 11 has a blind end passage bore 13 which opened through its first end, that is the end which has means for connection with the high pressure source 10, in this instance comprising an externally threaded stem 14 which is adapted to be threaded into a complementary threaded bore in the outlet of the high pressure source 10. Adjacent to its second end, the member 11 has a blind end cross port 15 communicating at its inner end with the inner end of the passage bore 13 and opening from a side face 17 of the member 11. In a desirable construction, the body members 11 and 12 comprise respective monolithic, high pressure resistant metal blocks.

Similarly, the connector body member 12 has a blind end passage bore 18 opening through its first end, and adjacent to the second end of the member 12 a blind end cross port 19 communicates at its inner end with the inner end of the passage bore 18 and opens from a side face 20 of the member 12. At its first end, the member 12 has means for connecting the bore 18 with the high pressure hose 8, in this instance comprising a coupling having a shouldered nipple 21 fixedly secured to the member 12 in a counter bore 22 concentric with the end of the passage bore 18 in a common sliding flat interface plane. A coupling nut 23 is adapted for securing the nipple 21 releasably to a coupling terminal 24 on the hose 8.

Means are provided for connecting the side faces 17 and 20 of the members 11 and 12, respectively, in pressure-tight swivel relation and with the ports 15 and 19 aligned, so that a continuous high pressure passageway is provided by way of the passage bores 13 and 18 and the ports 15 and 19. To this end, a bolt 25 has its shank of smaller diameter than the ports 15 and 19 extending concentrically through the ports and through respective clearance apertures 27 through the blind ends of the ports. A head 28 at one end of the bolt 25 engages one of the body members, herein the body member 12, and a nut 29 is threaded onto the opposite end of the bolt shank and engages the other of the body members, herein the member 11. By preference, the nut 29 is of any preferred self-locking type and is drawn up tight enough on the bolt 25 to maintain the body member side faces 17 and 20 in tight but swivelable relation so that the members 11 and 12 are adapted to swivel about the axis of the bolt 25. Suitable lubricant in the joint between the swivel surfaces 17 and 20 may be employed to facilitate swiveling. In a preferred arrangement, the swivel surfaces 17 and 20 are plane, i.e., flat, surfaces. It will be understood that the cross sectional flow area through the ports 15 and 19 should be calculated with respect to the diameter of the shank of the bolt 25 to provide a continuous non-throttling flow passageway with the passage bores 13 and 18.

High pressure fluid sealing means prevents leakage from the swivel joint and the bolt joints in the connector 5. For this purpose, one of the swivel faces 17 and 20, herein the face 17, has an annular rabbet seal groove 30 about the mouth of the port 15 and within which groove is mounted a sealing ring 31, preferably in the form of an O-ring. As shown, the groove 30 opens into the cross port 15 and also opens toward the opposite side face 20. The cross sectional diameter of the O-ring 31 is predetermined with respect to the depth and diameter of the groove 30, and such dimensions of the groove 30 are predetermined relative to the O-ring 31, so that in a free state lying within the groove 30, the O-ring 31 will, due to its relative cross section, project a limited distance into the plane of the swivel surface 17. In this free condition, also, the diameter of the groove 30 is sufficiently greater than the uncompressed circumferential diameter of the O-ring to receive the O-ring freely and with a slight clearance to permit expansion of the O-ring when compressed against the swivel surface 20. In addition, the uncompressed inside diameter of the O-ring 31 is sufficiently greater than the diameter of the port 15 to avoid reduction of the inside diameter of the O-ring under compression to a smaller diameter than the diameter of the ports 15 and 19 so that the passageway defined by the aligned ports 15 and 19 will remain unobstructed. In other words, choking effect of the passageway by the O-ring 31 under compression is avoided. Nevertheless, pressure exerted against the compressed O-ring in the joint will cause expansion of the O-ring into leak-proof sealing of the swivel joint. As to the joint between the member 11 and the bolt 25, a high pressure seal is provided by means of a sealing ring 32, preferably in the form of an O-ring seated in an annular seal groove 33 in the member 11 about the outer end of the aperture 27. Desirably the O-ring 32 is of an inside diameter to grip the bolt shank, and of a cross-sectional dimension slightly greater than the depth of the groove 33, and which is slightly larger in diameter than the uncompressed diameter of the O-ring 32. As a result, when the O-ring is placed under compression upon tightening of the nut 29, the O-ring will make substantially pressure-tight engagement with the surfaces confining it in the groove 33, and any pressure seeking to escape the joint will only cause a tighter sealing engagement of the O-ring 32 with the relevant surfaces at the joint.

Similarly, the joint between the bolt 25 and the member 12 is provided with a high pressure seal by means of a sealing ring 34 preferably in the form of an O-ring received in an annular seal groove 35 at the outer end of the aperture 27 in the member 12. The same parameters are defined for the O-ring 34 and the groove 35 as for the O-ring 32 and the groove 33.

Assembly of the connector 5 is readily effected by aligning the ports 15 and 19 of the body members 11 and 12 at the swivel surface joint 17, 20, with the O-ring 31 in its groove 30 and then assembling the bolt 25 through the assembled members 11 and 12 and more particularly through the apertures 27, with the O-rings 32 and 34 in place in their seal grooves. Then by securing the nut 29 on the bolt and drawing up the bolt fairly tightly while still permitting swivelling of the body members 11 and 12 about the axis of the bolt 25, the connector assembly is secured in effectively leak-proof manner. The O-ring sealing ring arrangement assures high-pressure sealing. While the swivel joint O-ring 31 thoroughly resists high pressure leakage at the swivel joint, the swivel joint is adapted to be free enough to permit swivelling about the axis of the connecting bolt 25 in response to pull on the hose 8 under only limited restraint as imposed by frictional braking action of the elastic O-ring 31.

It will be understood that variations and modifications may be effected without departing from the spirit and scope of the novel concepts of this invention.

I claim as my invention:

1. A high pressure hose swivel connector, comprising:

a pair of body members, each of which has a first and a second end;

each of said members having a respective blind end passage bore opening through its first end;

one of said members having means at its first end for connecting its bore with a high pressure source;

the other of said members having means at its first end for connecting its bore with a high pressure hose;

each of said members having adjacent to its second end a blind end cross port communicating with the inner end of the passage bore of the member and opening from a side face of the member;

said side faces being flat and slidably engaged in a common flat interface plane joint and with said cross ports concentrically aligned, so that a continuous high pressure passageway is provided by way of said bores and ports;

one of said side faces having an annular rabbet groove which opens into the associated cross port and also opens toward the opposite side face;

an O-ring pressure sealing ring mounted in said groove;

the dimensions of said O-ring and the dimensions of said groove being predetermined and corelated to assure that the O-ring will be under sealing compression when said faces are in slidable engagement but the inside diameter of the O-ring will remain free from obstructing said passageway through said ports;

and a bolt having a shank of a smaller diameter than said ports and extending concentrically through said ports and through apertures through the blind ends of said ports, and said bolt acting to press said members together and said faces into swivelling sliding engagement and placing said O-ring under compression so as to maintain said interface plane joint free from pressure loss from said passage.

2. A connector according to claim 1, wherein said members have respective parallel second flat faces on the sides of the members remote from said slidably engaged flat faces, said bolt having a head at one end and a securing nut at the opposite end, and sealing O-rings seated in annular grooves at the outer ends of said apertures and placed under sealing compression by respectively said head and said nut.

3. A connector according to claim 1, wherein said body members comprise respective monolithic, high pressure resistant metal blocks.

* * * * *